United States Patent [19]

Cook et al.

[11] 3,920,833

[45] Nov. 18, 1975

[54] ANTIFIBRINOLYTIC AGENTS

[75] Inventors: Elton S. Cook; Kinji Tanaka; Akira Fujii, all of Cincinnati, Ohio

[73] Assignee: Stanley Drug Products, Inc., Portland, Oreg.

[22] Filed: Aug. 8, 1974

[21] Appl. No.: 495,553

[52] U.S. Cl. ............................................. 424/303
[51] Int. Cl.$^2$......................................... A61K 31/26
[58] Field of Search .................................. 424/303

[56] References Cited
OTHER PUBLICATIONS

Chem. Abst.–67 11213f (1967).

Chem. Abst.–67 107180u (1967).

*Primary Examiner*—Stanley J. Friedman
*Attorney, Agent, or Firm*—John G. Schenk

[57] ABSTRACT

Considerable research has been directed in the last several years to the inhibition of fibrinolysis because of an increase in the use of these plasmin inhibitors. A new class of synthetic antifibrinolytic agents is provided herein. Certain omega-aminoalkanesulfonic acids have been found to exhibit potent antifibrinolytic activities.

5 Claims, No Drawings

ANTIFIBRINOLYTIC AGENTS

BACKGROUND OF THE INVENTION

This invention is concerned with compositions of matter which inhibit the fibrinolytic reaction in mammals.

Considerable research has been directed in the last several years to the inhibition of fibrinolysis, both in vitro and in vivo. As a consequence, for some time now inhibitors have been used to stop fibrinolytic bleeding occuring in connection with cardiac surgery, and during cirrhotic liver surgery. Antifibrinolytic agents have also become useful in gynecological and obstetrical bleeding. In addition it has recently been shown that such antifibrinolytic agents are useful, not only for the treatment of local hemorrhages, but also for the treatment of allergic inflammations. They are particularly useful in the internal treatment of certain types of hemophilia. Antifibrinolytic agents are thus used in connection with various forms of hyperplasminaemia. Recently, therefore, research has been stimulated to an even greater degree as a result of these increasing uses.

Among various plasmin inhibitors, two series of inhibitors have been developed and used in therapy: the synthetic inhibitors, and the natural inhibitors. These inhibitors, thus far, appear to have certain common characteristics. For the most part chemicals known to reverse the hyperplasminic state have been amino compounds.

Trasylol, one of the purified potent natural inhibitors, was found by Max and Werle. It was obtained from bovine parotid gland and lung, and is different from the antifibrinolysin obtained from the blood. It is very stable at high temperatures and acids, and has a molecular weight of 6,513. Essentially it is a basic polypeptide composed of sixteen different amino acids.

One of the most potent synthetic agents having an inhibiting effect on fibrinolysis is epsilon-aminocaproic acid (EACA). This synthetic plasmin inhibitor was found in a study of the relation of chemical structure to the inhibitory effect resulting from the examination of approximately 300 chemical compounds by Okamoto and his coworkers. The relationship between the chemical structure and the inhibitory effect of the compound has also been studied. Considerable effort has, thus, been directed to the development of plasmin inhibitors.

SUMMARY OF THE INVENTION

In accordance with the practice of this invention a new class of synthetic antifibrinolytic agents has been discovered. Certain omega-aminoalkanesulfonic acids have been found to exhibit potent antifibrinolytic activities. In fact, one of the members of this group has an antifibrinolytic activity equal to or greater than EACA.

DETAILED DESCRIPTION OF THE INVENTION

Many studies of the clinical application of EACA have been conducted by various workers in various countries. These clinical investigations have indicated a clear need for additional antifibrinolytic agents. In accordance with the practice of this invention, therefore, an additional process for the control of hyperplasminic conditions is provided. Certain omega-aminoalkanesulfonic acids are administered to mammals in need of an antifibrinolytic agent effective for the control of hyperplasminic conditions. These sulfonic acids, administered in fibrinolysis inhibiting amounts, are compounds having the formula $H_2N - (CH_2)n - SO_3H$ where $n$ is an integer of 1 through 4, that is, whole number less than five. Included are aminomethanesulfonic acid (Ame-$SO_3H$), beta-aminoethanesulfonic acid ($\beta$Aet-$SO_3H$), gamma-aminopropanesulfonic acid ($\gamma$Apr-$SO_3H$) and delta-aminobutanesulfonic acid ($\alpha$Abu-$SO_3H$).

The fibrinolytic activities of the omega-aminoalkanesulfonic acids will be apparent from the following test results. Although the literature contains several methods for the measurement of fibrinolytic or antifibrinolytic activities, many are still not wholly satisfactory. Of necessity the procedures must be quite complex because they involve three different enzymatic reactions: (1) the formation of fibrinolysin; (2) fibrin clot formation; and (3) fibrinolysis. Even the control, which involves the fibrinolysis of a bovine fibrin clot formed from bovine fibrinogen and thrombine by human fibrinolysin activated by streptokinase, has given a wide range of lysis times.

The most satisfactory method of measuring antifibrinolytic activities is, consequently, believed to involve the use of two experimental procedures, the lysis time, and the lysis area methods. In the former, a fibrin clot is formed in the presence of the serum-streptokinase system. In the latter, a fibrin clot is formed in the absence of the serum-streptokinase system. For the purpose of this comparison both of these methods were employed in the testing of the sulfonic acids utilized herein. Hence both of these methods are now described in detail.

Lysis time Method: This method was slightly modified from that which has been described by Okamoto and Okamoto, Keio J. Med., 11, 105 (1962). In a series of test tubes (8 i. d. × 75 mm) 0.1 ml of standard human serum, 0.4 ml of sample solution in 1/20 $\mu$phosphate buffer saline solution, and 0.1 ml saline solution containing 100 units of streptokinase were mixed at 0° C. Then 0.05 ml of a saline solution containing 5 units of thrombin and 0.3 ml of a 0.33% bovine fibrinogen in saline solution were added. After the mixture was incubated at 25° C for five minutes, the test tubes were inclined at the angle of $-20°$ to the horizontal and rapidly vibrated (70 vibrations per minute, amplitude 15 mm) to minimize the influence of the test tubes and other factors. With this vibration system 83.3% of the clots were dissolved in 7 to 9 minutes, whereas without vibration a broader range of lysis time was found, i. e., 85.0% of the clots were dissolved in 8 to 13 minutes. The vibration of the tube was an attempt to minimize the influence of slight differences of inclinations of the tubes and surface tensions. More consistent results were obtained by this procedure. The lysis time is the number of minutes required for the clot to flow out.

Lysis Area Method: The method used is a modification of the one described by Astrup and Müllertz, Arch. Biochem. Biophys., 40, 346 (1952), and similar to that reported by Okamoto, RinshoKensa, 8, 966 (1964). Into a petri dish, 10 cm i. d., 10 ml of 0.4% bovine fibrinogen in pH 7.4 Palitzsch's Buffer was poured by means of a pipette. The dish was kept horizontal. Into the solution, 5 ml of 10 units per ml bovine thrombin in pH 7.4 Palitzsch's Buffer was added, while the dish was rotated for 3 seconds to permit mixture of the ingredients. A bovine fibrin plate was formed right after the mixing and was kept at room temperature for 30 minutes to harden. The surface of the plate was then dried in the incubator at 37° C for 30 minutes without the cover (Standard Plate). The sample was dropped onto the plate by means of a pipette, or was dropped onto a paper disc placed on the plate. The plate was then incubated at 37° C for 2 hours to 20 hours. The lysis area was obtained by measuring the largest and the shortest distance of the clear zone.

The antifibrinolytic activities of the omega-aminoalkanesulfonic acids contemplated herein are given in the following table. EACA was a positive control, and 0.05 M phosphate buffer saline solution, the solvent for the compounds, was used as a negative control. The concentration of each sample was $10^{-6}$ M.

ANTIFIBRINOLYTIC ACTIVITY OF ω-AMINOALKANESULFONIC ACIDS

| Compound | Lysis Time, Min. | | Lysis Area, % Inhib. | |
|---|---|---|---|---|
| | mean | SD | mean | SD |
| Ame-SO$_3$H | 9 | 3 | 1 | 4 |
| βAet-SO$_3$H | 10 | 2 | 8 | 3 |
| γApr-SO$_3$H | 14 | 4 | 28 | 8 |
| αAbu-SO$_3$H | 23 | 2 | 62 | 7 |
| neg. cont. | 7 | 1 | — | — |
| EACA | 22 | 4 | 42 | 12 |

As can be seen from the data in the foregoing table the omega-aminoalkanesulfonic acids herein were found to be active against fibrinolysis. Particularly significant is the fact that delta-aminobutanesulfonic acid is as effective as, and indications are more effective than, EACA, reported as the most potent antifibrinolytic agent of a series of straight chain omega-amino acids. The delta compound is also more potent than εApe-SO$_3$H, the $n=5$ compound.

The aminomethanesulfonic acid was prepared by the following reaction described by Reinking et al., in Chem. Ber., 38, 1069 (1905) (Procedure A).

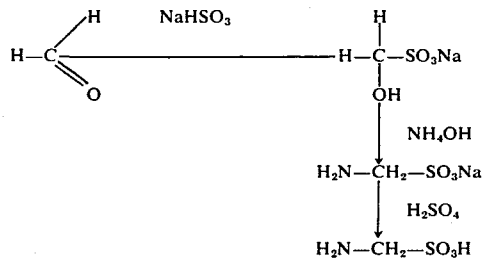

As an example of this preparation the following is given:

To a mixture of 111 g of NaHSO$_3$ in 139 g of H$_2$O and 85.2 g of 36% HCHO, 61.5 g of 28% NH$_4$OH is added dropwise through a separatory funnel at 75° C with stirring. After the addition of NH$_4$OH, the mixture is allowed to stand at the same temperature for 1 hour and then cooled. The chilled reaction mixture is treated with concentrated H$_2$SO$_4$ (pH 1.0) to give fine, white crystals. After filtration, the crystals are washed with a small portion of cold H$_2$O. Recrystallized from hot H$_2$O: Yield, 20.4 g (32.5%); M.P., 184°–185°C., decomp.

Analysis—Calculated for CH$_5$NO$_3$S (percent): C, 10.81; H, 4.54; N, 12.61; S, 28.85. Found (percent): C, 10.92; H, 4.51; N, 12.70; S, 28.90 (analyzed by Galbraith Laboratories, Inc.).

The remaining omega-aminoalkanesulfonic acids were prepared by the following reactions described by Marvel et al., in J. Amer. Chem. Soc., 49, 1883 (1927). (Procedure B)

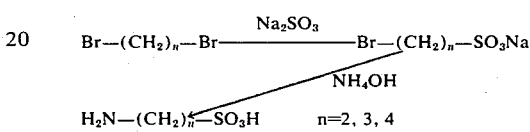

As an example of these preparations, delta-aminobutanesulfonic acid was prepared as follows:

In a 500 ml round-bottom flask fitted with a reflux condenser, a mechanical stirrer, and a separatory funnel, are placed 100.0 g of Br(CH$_2$)$_4$Br, 194 ml of 95% EtOH, and 20 ml of H$_2$O. To the well-stirred boiling mixture, a solution of 30.0 g of anhydrous Na$_2$SO$_3$ in 60 ml of H$_2$O is added through the separatory funnel over a period of about 2 hours. The reaction mixture is then concentrated in vacuo. The Br(CH$_2$)$_4$SO$_3$Na is extracted from the dry residue with 150 ml of 95% EtOH using a Soxhlet extractor. On cooling the extract, white crystals are obtained. The product is further purified by crystallizing from hot EtOH: Yield, 30.6 g (91.0%). Crude Br(CH$_2$)$_4$SO$_3$Na (30.0 g) is treated with 600 ml of concentrated NH$_4$OH. The crude product is purified using ionexchange chromatography on AG 1-×8, 100–200 mesh, 2.0 × 40 cm column, OH$^-$ form. The amounts of effluent solutions are 600 ml and 1000 ml of H$_2$O and 0.02 N NCl, respectively. The pure fractions are pooled and concentrated to dryness in vacuo. Crystallized from hot H$_2$O-EtOH: Yield, 13.3 g (69.0%); M.P. 250°–251°C, decomp.

Analysis— Calculated for C$_4$H$_{11}$NO$_3$S (percent): C, 35.91; H, 7.84; N, 8.38; S, 19.17. Found (percent): C, 35.82; H, 7.75; N, 8.06; S, 18.97 (analyzed by Galbraith Laboratories, Inc.).

Melting points, yields and R$_f$ values of each of these omega-aminoalkanesulfonic acids are as follows:

OMEGA-AMINOALKANESULFONIC ACIDS
H$_2$N—(CH$_2$)$_n$—SO$_3$H

| n | Compd | Procedure | Yield,% | Mp,°C | Solvent | Formula |
|---|---|---|---|---|---|---|
| 1 | Ame-SO$_3$H | A | 32.5 | 184–185, dec | H$_2$O | CH$_5$NO$_3$S |
| 2 | βAet-SO$_3$H | B | 61.8 | 264–266 | H$_2$O—EtOH | C$_2$H$_7$NO$_3$S |
| 3 | γApr-SO$_3$H | B | 81.0 | 269–271, dec | sa | C$_3$H$_9$NO$_3$S |
| 4 | αAbu-SO$_3$H | B | 62.8 | 250–251, dec | sa | C$_4$H$_{11}$NO$_3$S |

"R$_f$ VALUES OF OMEGA-AMINOALKANESULFONIC ACIDS ON TLC*(R$_f$ × 100)"

| Compound | Solv-1 | Solv-2 | Solv-3 | Solv-4 | Solv-5 |
|---|---|---|---|---|---|
| Ame-SO$_3$H | 15 | 44 | 50 | 75 | 89 |
| βAet-SO$_3$H | 32 | 41 | 49 | 66 | 84 |
| γApr-SO$_3$H | 34 | 35 | 46 | 46 | 71 |
| αAbu-SO$_3$H | 35 | 31 | 45 | 33 | 69 |

-continued
OMEGA-AMINOALKANESULFONIC ACIDS
$H_2N-(CH_2)_n-SO_3H$

| n | Compd | Procedure | Yield,% | Mp,°C | Solvent | Formula |
|---|-------|-----------|---------|-------|---------|---------|
|   | L-Ala | 35        | 41      | 46    | 44      | 80      |

*Silica gel G, 250μ plates
Solv-1; PhOH: $H_2O(75:25w/w)$, /w), pH 2.0
Solv-2; nBuOH: AcOH: $H_2O(60:20:20)$, pH 2.4
Solv-3; iPrOH: formic acid: $H_2O(77:4:19)$, pH 2.7
Solv-4; secBuOH: MeCOEt: dicyclohexylamine: $H_2O(55:15:10:20)$, pH 10.3
Solv-5; $CHCl_3$: MeOH: 17% $NH_4OH(40:40:20)$, pH 11.6

This invention thus makes available a new class of drugs for the control of hyperplasminaemia by the inhibition of plasminogen activation. The drug can be used for the prevention or treatment of conditions in mammals if it is administered to a hyperplasminic mammal in a plasmin inhibiting amount in the form of tablets for oral use or in a saline carrier for intravenous injection. Normally amounts varying from 10 to 500 mg/kg body weight will be employed. Variations in the amounts as well as modes of use and administration will be apparent to those working in this field. These and other obvious ramifications are deemed to be within the scope of this invention.

What is claimed is:

1. A process for the control of hyperplasminaemia in a mammal which comprises administering to a hyperplasminic mammal a plasmin inhibiting amount effective to control hyperplasminaemia of an omega-aminoalkanesulfonic acid having the formula $H_2N - (CH_2)_n - SO_3H$ where n is a whole number less than five.

2. The method of claim 1 where $n$ is 1, the acid being aminomethanesulfonic acid.

3. The method of claim 1 where $n$ is 2, the acid being beta-aminoethanesulfonic acid.

4. The method of claim 1 where $n$ is 3, the acid being gamma-aminopropanesulfonic acid.

5. The method of claim 1 where $n$ is 4, the acid being delta-aminobutanesulfonic acid.

* * * * *